(12) United States Patent
Yano

(10) Patent No.: US 7,681,896 B2
(45) Date of Patent: Mar. 23, 2010

(54) THRUST BEARING AND SUSPENSION FOR VEHICLE

(75) Inventor: Hiroshi Yano, Okazaki (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 735 days.

(21) Appl. No.: 11/483,186

(22) Filed: Jul. 10, 2006

(65) Prior Publication Data
US 2007/0009190 A1    Jan. 11, 2007

(30) Foreign Application Priority Data
Jul. 11, 2005    (JP)    ............................ P2005-201788

(51) Int. Cl.
*B60G 15/00* (2006.01)
(52) U.S. Cl. .............................. 280/124.155
(58) Field of Classification Search .......... 280/124.145, 280/124.146, 124.147, 124.154, 124.155
See application file for complete search history.

(56) References Cited

U.S. PATENT DOCUMENTS

| | | | | |
|---|---|---|---|---|
| 4,248,454 | A | * | 2/1981 | Cotter et al. .......... 280/124.155 |
| 4,566,812 | A | * | 1/1986 | Takei et al. ................... 384/484 |
| 5,308,048 | A | * | 5/1994 | Weaver et al. ................ 267/220 |
| 2001/0015537 | A1 | * | 8/2001 | De Fontenay et al. . 280/124.155 |

FOREIGN PATENT DOCUMENTS

| | | |
|---|---|---|
| EP | 1 243 446 A | 9/2002 |
| FR | 2 145 082 A | 2/1973 |
| GB | 2 145 781 A | 4/1985 |
| JP | 60-45108 | 3/1985 |
| JP | 62-8421 | 1/1987 |
| JP | 4-1720 | 1/1992 |
| JP | 2501751 | 4/1996 |
| JP | 2769206 | 4/1998 |
| JP | 2949794 | 7/1999 |
| JP | 3003386 | 11/1999 |
| JP | 2000-88031 A | 3/2000 |
| JP | 2001-27228 A | 1/2001 |
| JP | 3151948 | 1/2001 |

OTHER PUBLICATIONS

European Search Report dated May 7, 2008.

\* cited by examiner

*Primary Examiner*—Faye M. Fleming
(74) *Attorney, Agent, or Firm*—McGinn IP Law Group PLLC

(57) ABSTRACT

A thrust ball bearing includes an upper case and a lower case. In the upper case and the lower case, annular rings which are formed in the upper case and the lower case, respectively support balls which are rolling elements, and inter-case gaps are formed between the upper case and the lower case in order to reduce sliding resistance and rotational torque. A seal unit is formed on an inner circumferential surface of the lower case. The seal unit is made up of a recess portion which is formed on the inner circumferential surface and a rubber elastic element which is made as a separate element from the lower case and is then fitted in the recess portion. The recess portion is formed into an annular shape along a circumferential direction of the inner circumferential surface.

20 Claims, 8 Drawing Sheets

THRUST BEARING AND SUSPENSION FOR VEHICLE

BACKGROUND OF THE INVENTION

The present invention relates to a thrust bearing for use in a strut suspension and an automotive suspension for a vehicle.

In a strut suspension which connects a wheel to a vehicle body, a shock absorber is provided for absorbing or damping vibrations of a spring interposed between the vehicle body and the road wheel. The shock absorber has a cylinder and a strut piston rod and is designed to damp the vibrations of the spring by virtue of resistance produced when the strut piston rod is retracted into the interior of the cylinder.

A cylindrical bounce stopper made of a rubber elastic element is provided in such a manner as to cover an outer circumference of the strut piston rod of the shock absorber, and the bounce stopper has a function to control the relative movement of the cylinder and the strut piston rod. Vibrations and impact from the road wheel are absorbed by virtue of the elastic deformation of the rubber elastic element.

Then, a porous elastic element formed of such as expanded urethane rubber is used for the bounce stopper in order to obtain good riding comfort while absorbing the vibrations of the vehicle.

Incidentally, thrust bearings are provided on strut suspensions of the vehicle between struts and the vehicle body for holding road wheels on both sides while following pivot motions of strut rods when the road wheels are steered (for example, Patent Document No. 1).

Figure 8:
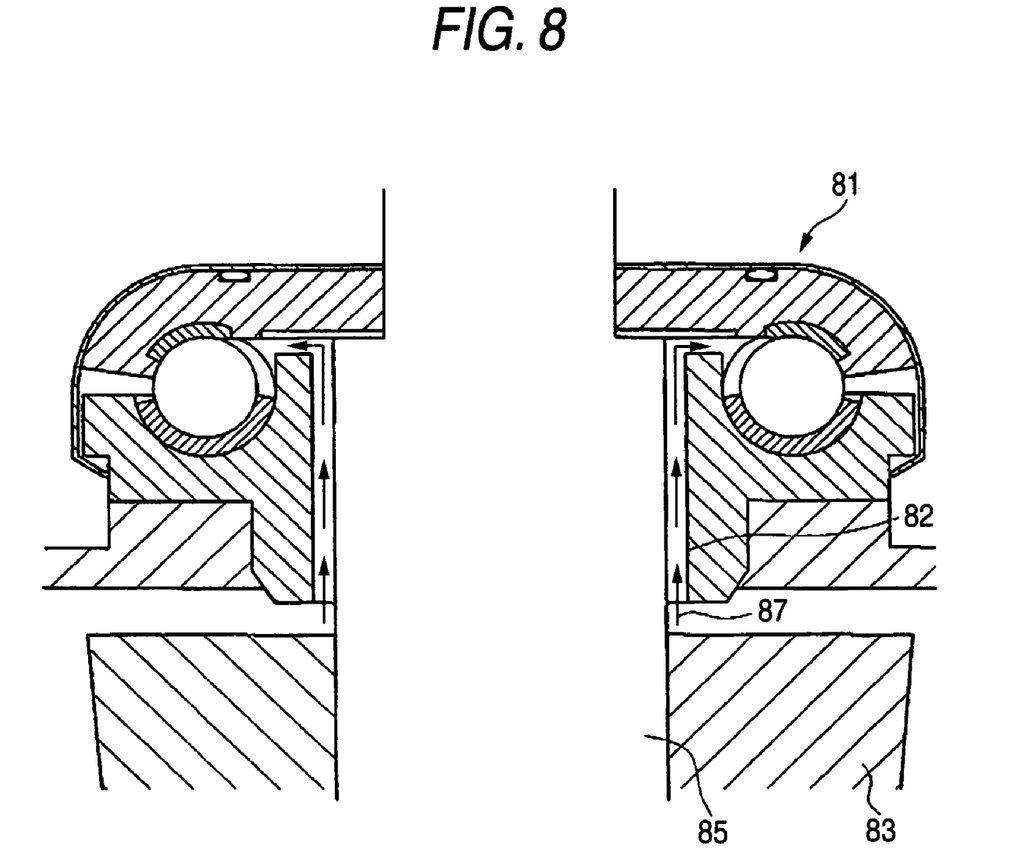
FIG. 8 is an explanatory diagram illustrating a problem inherent in the related art.

As shown in FIG. 8, when a thrust bearing 81 is mounted on a strut piston rod 85, a gap is produced between an inner circumferential surface 82 of the thrust bearing 81 and the strut piston rod 85.

Patent Document No. 1: Japanese Utility Model Registration No. 2501751

As shown in FIG. 8, when the porous elastic element formed of such as expanded urethane rubber is used as the bounce stopper 83 in order to obtain good riding comfort while absorbing the vibrations of the vehicle body, a problem occurs in which muddy water or the like 87 absorbed into the bounce stopper 83 intrudes into the interior of the bearing from the gap between the piston rod 85 and the inner circumferential surface 82 of the thrust bearing 81.

SUMMARY OF THE INVENTION

An object of the invention is to provide a thrust bearing for a strut suspension which makes use of a porous elastic element as a bounce stopper which can prevent the intrusion of muddy water or the like which is absorbed by the porous elastic element into the interior of the bearing via a strut piston rod and a suspension for a vehicle which utilizes the thrust bearing.

In order to solve the above object, the present invention is characterized by having the following arrangements.

(1) A thrust bearing supported by a coil spring seat and a strut piston rod, the thrust bearing comprising:
 a primary case fixed to the strut piston rod;
 a secondary case that is supported by the coil spring seat and is coaxially rotatable with respect to the primary case;
 a plurality of rolling elements axially interposed between the primary and secondary cases; and
 a seal unit provided on an inner circumferential surface of the secondary case, wherein when the strut piston rod is inserted into the secondary case, the seal unit is brought into contact with an outer circumferential surface of the strut piston rod for sealing a gap between the inner circumferential surface of the secondary case and the outer circumferential surface of the strut piston rod so that liquid is prevented from intruding from the gap.

(2) The thrust bearing according to (1), wherein the seal unit includes a rubber elastic element which is formed separately from the secondary case and is provided on the inner circumferential surface of the secondary case.

(3) The thrust bearing according to (2), wherein the seal unit includes a groove on which the rubber elastic element is mounted.

(4) The thrust bearing according to (1), wherein the seal unit is integrated with the secondary case so as to protrude from the inner circumferential surface thereof.

(5) The thrust bearing according to (2), wherein the seal unit has an annular shape which fits the inner circumferential surface of the secondary case and includes a distal edge portion which is to contact the strut piston rod and faces downward in an axial direction thereof.

(6) The thrust bearing according to (1), wherein
 the primary case is provided with a primary ring forming an upper raceway surface, and the secondary case is provided with a secondary ring forming an lower raceway surface,
 the plurality of rolling elements roll on the upper and lower raceway surfaces.

(7) A suspension for a vehicle comprising:
 a coil spring;
 a shock absorber that is provided inside the coil spring and includes a strut piston rod having a piston provided at a lower end thereof;
 a coil spring seat supported by the coil spring;
 a thrust bearing that is supported by the coil spring seat; and
 a bounce stopper made of a porous elastic element which is suspended below the coil spring seat so as to cover the strut piston rod,
 wherein the thrust bearing comprises:
 a primary case fixed to an upper portion of the strut piston rod;
 a secondary case that is supported by the coil spring seat and is coaxially rotatable with respect to the primary case;
 a plurality of rolling elements axially interposed between the primary and secondary cases; and
 a seal unit provided on an inner circumferential surface of the secondary case, wherein when the strut piston rod is inserted into the secondary case, the seal unit is brought into contact with an outer circumferential surface of the strut piston rod for sealing a gap between the inner circumferential surface of the secondary case and the outer circumferential surface of the strut piston rod so that liquid is prevented from intruding from the gap.

(8) The suspension according to (7), wherein the seal unit includes a rubber elastic element which is formed separately from the secondary case and is provided on the inner circumferential surface of the secondary case.

(9) The suspension according to (8), wherein the seal unit includes a groove on which the rubber elastic element is mounted.

(10) The suspension according to (7), wherein the seal unit is integrated with the secondary case so as to protrude from the inner circumferential surface thereof.

(11) The suspension according to (8), wherein the seal unit has an annular shape which fits the inner circumferential surface of the secondary case and includes a distal edge portion which is to contact the strut piston rod and faces downward in an axial direction thereof.

(12) The suspension according to (7), wherein the primary case is provided with a primary ring forming an upper raceway surface, and the secondary case is provided with a secondary ring forming an lower raceway surface, the plurality of rolling elements roll on the upper and lower raceway surfaces.

According to the configuration described above, since the thrust bearing has the seal unit on the inner circumferential surface of the secondary case, the gap between the inner circumferential surface of the secondary case and the outer circumferential surface of the strut piston rod is covered by the seal unit, thereby making it possible to prevent the intrusion of muddy water, dust or the like into the interior of the bearing which attempts to intrude into the interior of the bearing from the outside thereof through the gap between the inner circumferential surface of the secondary case and the outer circumferential surface of the strut piston rod.

While the intrusion of muddy water or the like which is absorbed by the bounce stopper into the interior of the thrust bearing from the gap between the inner circumferential surface of the bearing and the strut piston rod is facilitated by mounting the bounce stopper made of the porous elastic element below the bearing, since the seal unit is formed on the inner circumferential surface of the thrust bearing, the intrusion of liquefied intrusion matters into the interior of the bearing can be prevented by the seal unit so formed.

According to the configuration described above, the distal edge portion of the rubber elastic element can be brought into contact with the strut piston rod so as to cover the gap between the inner circumferential surface of the secondary case and the outer circumferential surface of the strut piston rod. Since the adhesion between the rubber elastic element and the strut piston rod is increased due to the elastic deformation of the rubber elastic element, in the event that the rubber elastic element is used, high waterproofing effect can be obtained.

In the event that the seal unit is made to be formed integrally with the secondary case in this way, the number of steps involved in the production of the thrust bearing can be reduced and hence, the production costs can be reduced.

Although the bounce stopper made of the porous elastic element is used in order to suppress the vibration of the vehicle, in the event that the bounce stopper like this is used, there was a problem that muddy water or the like which is absorbed by the bounce stopper intrudes into the interior of the thrust bearing from the gap between the strut piston rod and the inner circumferential surface of the bearing. However, according to the above configuration in which the thrust bearing has the seal unit which is provided on the inner circumferential surface of the secondary case or the outer circumferential surface of the strut piston rod, the intrusion of liquefied intrusion matters such as muddy water or the like into the interior of the bearing can be prevented while maintaining the effect of suppressing the vibration or the like of the vehicle.

According to the configuration described above, the distal edge portion of the rubber elastic element can be brought into contact with the strut piston rod so as to cover the gap between the inner circumferential surface of the secondary case and the outer circumferential surface of the strut piston rod.

In the event that the seal unit is made to be formed integrally with the secondary case in this way, the number of steps involved in the production of the thrust bearing can be reduced and hence, the production costs can be reduced.

DETAILED DESCRIPTION OF PREFERRED EMBODIMENTS

Embodiments according to the invention will be described below with reference to the accompanying drawings.

First Embodiment

Figure 1:
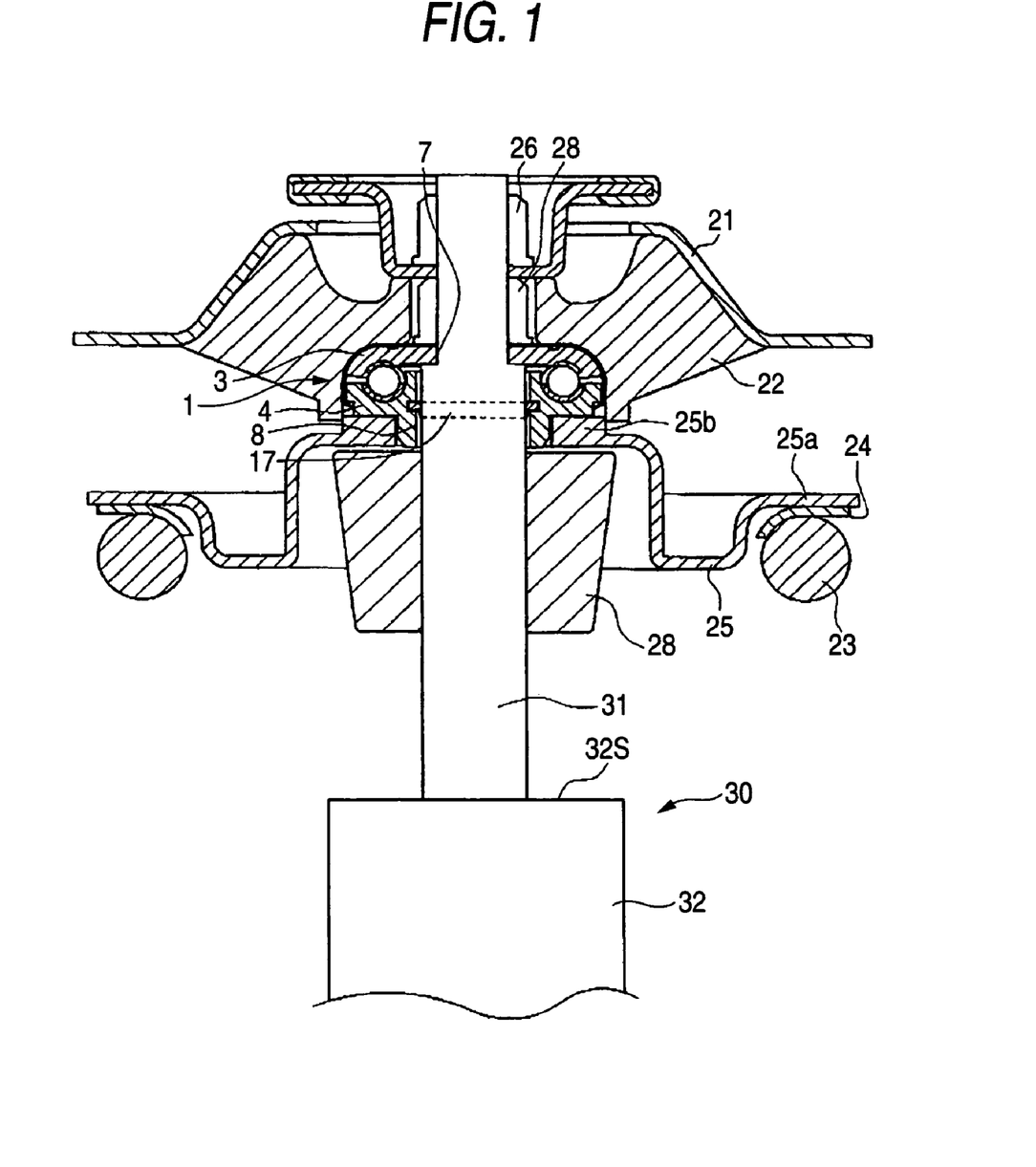
FIG. 1 is a sectional view showing an embodiment of an suspension of the invention.

The construction of an upper part of a strut suspension used on a vehicle such as a vehicle is shown in FIG. 1. The strut suspension includes a coil spring seat 25 which holds a spring seat 24 of a coil spring 23, a shock absorber 30, a thrust ball bearing 1 which is fitted on an upper end portion of a strut piston rod of the shock absorber 30, a nut 26 which fixes the thrust ball bearing 1 at the upper portion of the thrust ball bearing 1, and a strut mount rubber 22 and a strut support 21 which hold the thrust ball bearing 1 in such a manner as to surround the bearing.

The shock absorber 30 includes a cylinder 32 and a strut piston rod 31 which extends from a piston accommodated in the cylinder 32. A bounce stopper 28 made up of a porous elastic element made of such as expanded urethane rubber is provided on an outer circumference of the strut piston rod 31. Thus, in the event that the cylinder 32 rises, the bounce stopper 28 comes into abutment with an end face 32s of the cylinder 32 which lies at a piston rod protruding end thereof to thereby be subjected to an axial elastic compression deformation, whereby absorption of impact energy and mitigation of impact noise are attempted to be realized. Namely, the bounce stopper 28 made of expanded urethane rubber or the like is mounted on the piston rod 31 in order to prevent an excessive travel of the cylinder 32. The porous elastic element made of expanded urethane rubber or the like tends to absorb water or the like, and when it is elastically deformed under compression, the bounce stopper 28 discharges water or the like which is absorbed therein, and the water so discharged intrudes into a gap between an inner circumferential surface 8 of a lower case 4 and the strut piston rod 31.

The thrust ball bearing 1 is disposed between the strut mount rubber 22 and the coil spring seat 25. The strut mount rubber 22 is fixed to the strut piston rod 31 and is placed on an upper case 3 of the thrust ball bearing 1. The coil spring seat 25 is an annular disk-shaped support structural element which is supported by an upper end portion of the spring seat of the coil spring 23 of the suspension at a lower surface of an outer circumferential portion 25a thereof and is adapted to support the lower case 4 of the thrust ball bearing 1 at an upper surface of an inner circumferential portion 25b thereof.

The strut piston rod 31 is inserted into respective inner circumferential surfaces of the upper case 3 and the lower case 4. The upper case 3 is fixed integrally to the strut piston rod 31 and rotates relative to the lower case 4.

Figure 2:
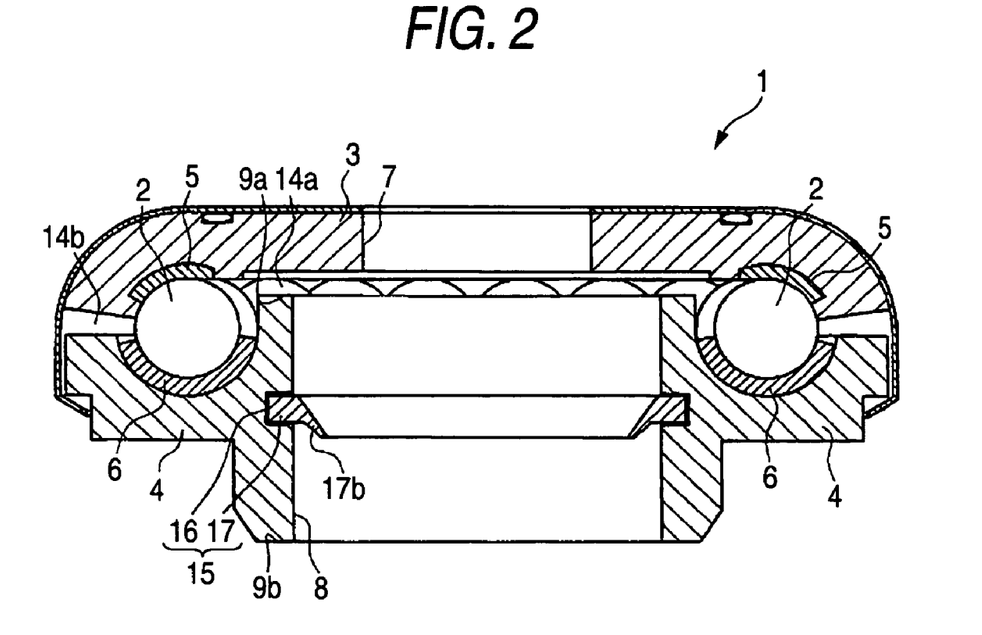
FIG. 2 is a sectional view showing a thrust bearing of Embodiment 1.

The trust ball bearing 1 according to the invention which is used on a strut suspension will be described using FIG. 2. The thrust ball bearing 1 includes the upper case 3, which is a primary case, and the lower case 4, which is a secondary case. An upper annular ring 5 and a annular lower ring 6, which are both made of a steel material, are provided at the upper case 3 and the lower case 4, respectively, so that upper and lower sides of a plurality of rolling elements 2 of steel balls 2 are supported by the annular upper ring 5 and lower ring 6 in the upper case 3 and lower case 4. The upper case 3 and the lower case 4 are each formed of a synthetic resin and integrally incorporate therein the upper ring 5 and the lower ring 6 through mount molding. The synthetic resin is any of polyamide, polyacetal and phenol resins and a resin resulting by reinforcing any of these resins by glass fibers.

In the upper case 3 and the lower case 4, the annular rings 5, 6 support the balls 2 as rolling elements, respectively and inter-case gaps 14a, 14b are formed between the upper case 3 and the lower case 4 in order to reduce sliding resistance and rotational torque, whereby the upper case 3 and the lower case 4 are put in a non-contact state. Namely, the upper case 3 and the lower case 4 are disposed to face each other in such a manner that an internal inter-case gap 14a is formed radially inwards of the balls 2 by the upper case 3 and the lower case 4 and an external inter-case gap 14b is formed radially outwards of the balls 2 by the upper case 3 and the lower case 4, so that the upper case 3 and the lower case 4 are made capable of rotating relatively via the balls 2.

An annular seal unit 15 is provided on the inner circumferential surface 8 of the lower case 4. The seal unit 15 includes a recess portion 16 formed on the inner circumferential surface 8 and a rubber elastic element 17 made as a separate element from the lower case 4 to be fitted in the recess portion 16. The recess portion 16 is formed annularly along a circumferential direction of the inner circumferential surface. The rubber elastic element 17 is mounted in the recess portion 16 in such a form that a distal edge portion 17b thereof faces downwards. Note that the rubber elastic element 17 is mounted in the recess portion 16 without a gap.

Figure 3A:
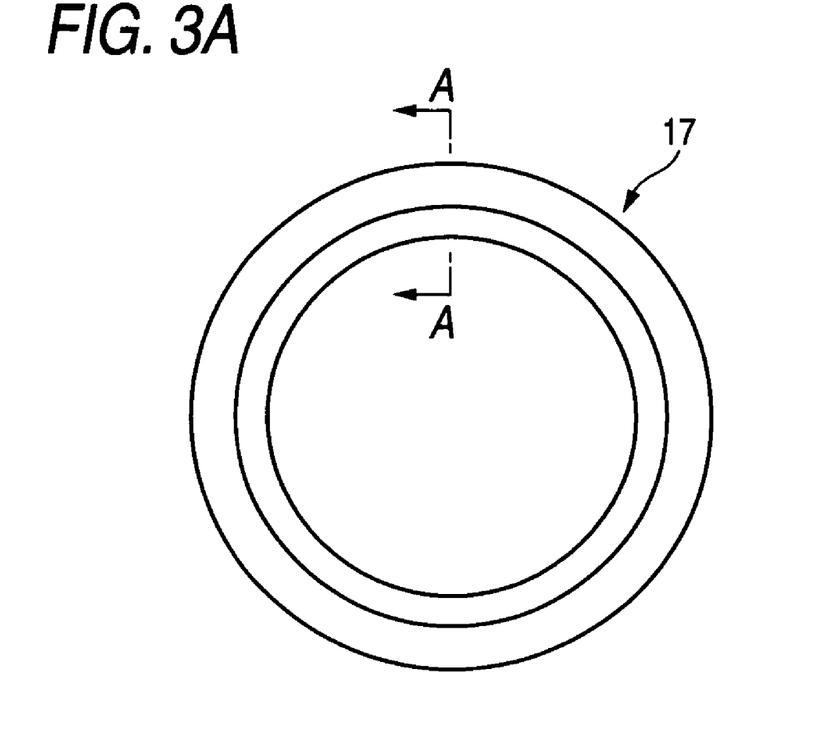
FIGS. 3A and 3B are diagrams showing a rubber elastic element.
Figure 3B:
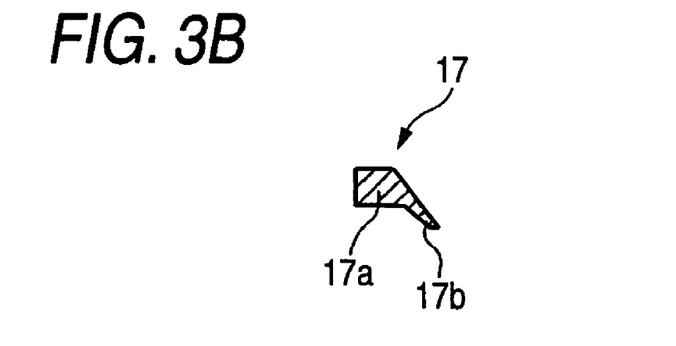

The rubber elastic element 17 which is formed as the separate element from the lower case is shown in FIGS. 3A and 3B. FIG. 3A is a plan view of the rubber elastic element 17, and FIG. 3B is a sectional view taken along the line A-A in FIG. 3A. As shown in FIG. 3A, the rubber elastic element 17 is formed into an annular shape. As shown in FIG. 3B, the rubber elastic element 17 includes a main body portion 17a and the distal edge portion 17b protruding from the main body portion 17a.

The rubber elastic element 17 is formed of, for example, nitril rubber (NBR), acrylic rubber, silicone rubber, fluororubber and the like. In particular, nitril rubber is desired as it has superior elasticity, wear resistance and mechanical strength.

Figure 4:
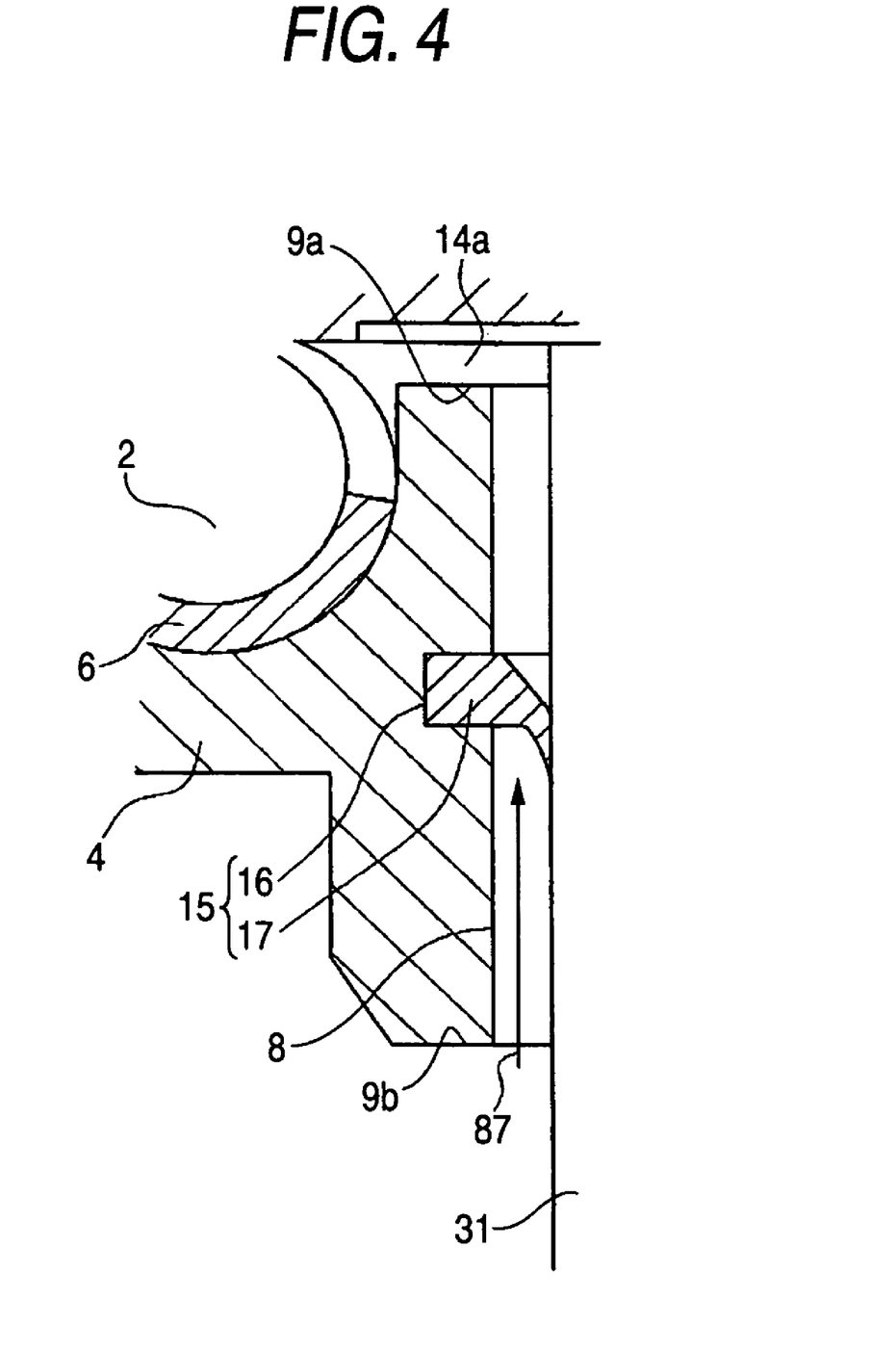
FIG. 4 is an explanatory diagram illustrating sealing by a seal unit.

When the thrust ball bearing 1 in which the seal unit 15 is provided on the inner circumferential surface by fitting the rubber elastic element 17 in the recess portion 16 is fitted to the strut piston rod 31 as shown in FIG. 4, a gap between the lower case 4 and the strut piston rod 31 is sealed as a result of elastic deformation of the rubber elastic element 17, whereby liquefied intrusion matters 87 such as muddy water or the like which is absorbed by the bounce stopper 28 can be prevented from intruding into the interior (the rolling elements side) of the bearing.

Note that the seal unit 15 may be formed between an upper end portion 9a and a lower end portion 9b of the inner circumferential surface 8 of the lower case 4.

Embodiment 2

Figure 5:
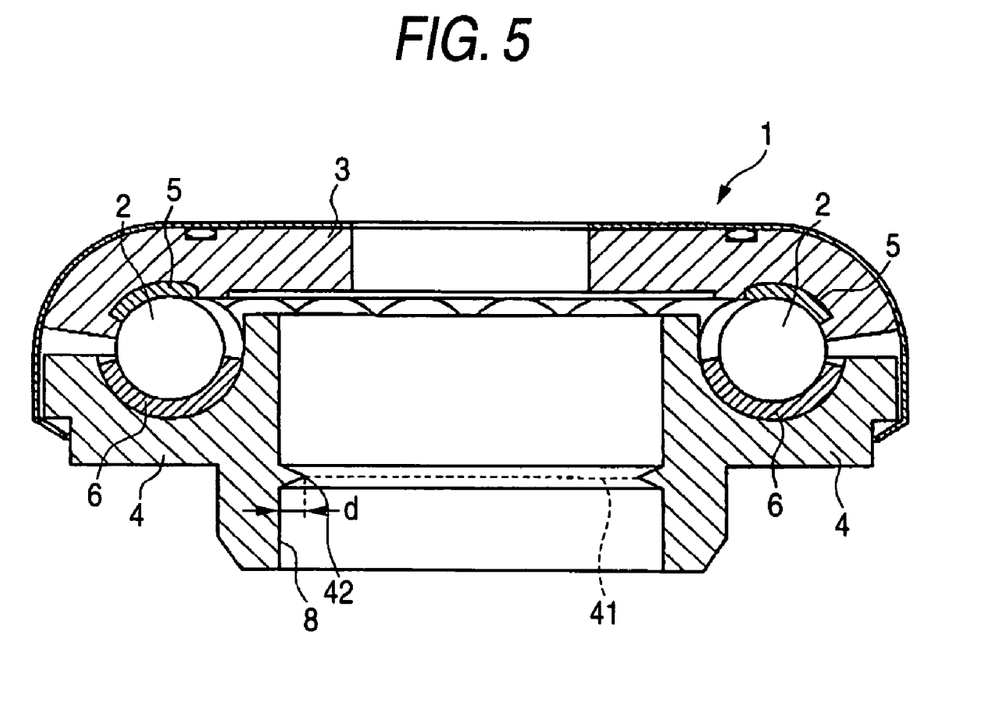
FIG. 5 is a sectional view of a thrust bearing of Embodiment 2.
Figure 6:
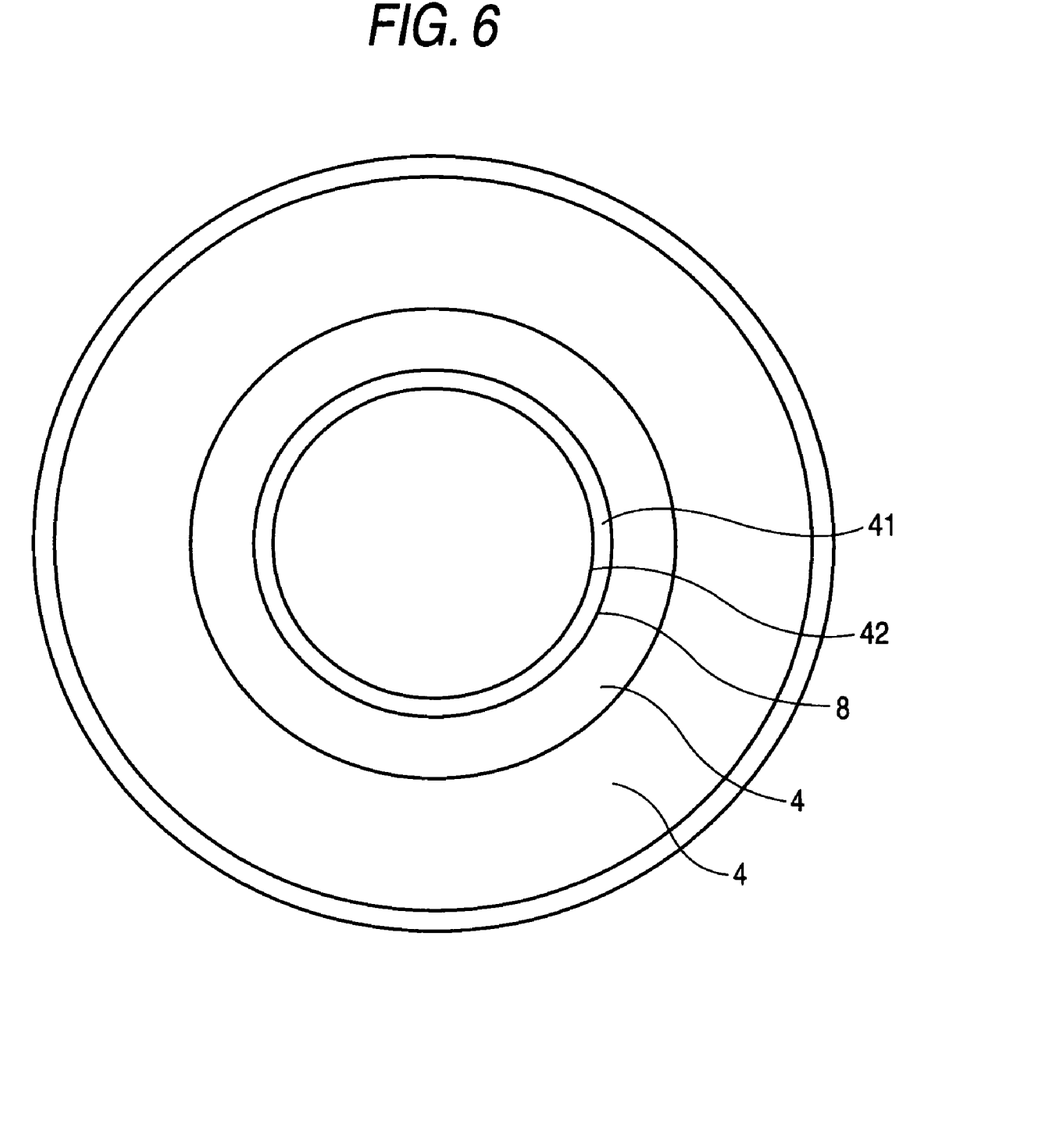
FIG. 6 is a bottom view of the thrust bearing of Embodiment 2.

A thrust ball bearing according to a second embodiment of the invention which is adapted to be used on the strut suspension will be described below with reference to FIGS. 5 and 6. FIG. 5 is a sectional view of a thrust bearing, and FIG. 6 is a bottom view thereof. Details of the embodiment are similar to those of the embodiment that has been described above, and hence, the description thereof will be omitted.

In this embodiment, a thrust ball bearing 1 includes an annular projecting seal member 41 which is formed as a seal unit annularly and integrally on an inner circumferential surface 8 of a lower case 4 so as to project radially inwards from the inner circumferential surface 8. The annular projecting seal member 41 is formed such that a projecting height d in the radial direction thereof is substantially equal to a gap between the inner circumferential surface 8 and the strut piston rod 31, and a projecting distal edge portion 42 is brought into abutment with the strut piston rod 31. The gap between the inner circumferential surface 8a and the strut piston rod 31 can be covered by the abutment of the projecting distal end portion 42 of the annular projecting seal unit 41 with the strut piston rod 31 which is inserted into the bearing 1, whereby liquefied intrusion matters such as muddy water or the like which is absorbed by the bounce stopper 28 can be prevented from intruding into the interior (the rolling elements side) of the bearing.

Embodiment 3

Figure 7:
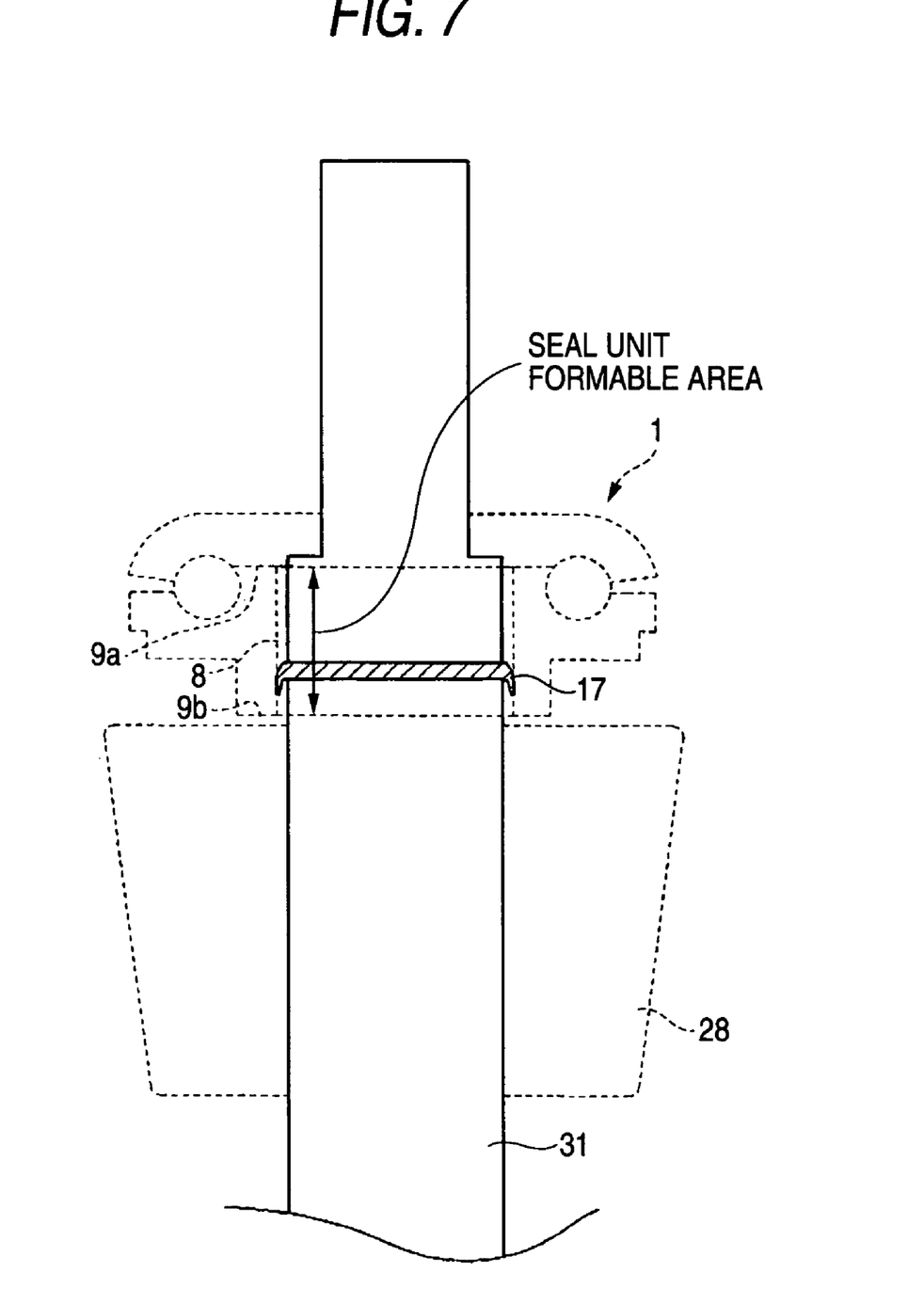
FIG. 7 is a diagram illustrating an embodiment in which a seal unit is provided on a strut piston rod.

An embodiment 3 according to the present invention is shown in FIG. 7 in which a seal unit is formed on a strut piston rod 31. In this embodiment, a rubber elastic element 17 is mounted on the strut piston rod 31 in such a manner that a distal end portion of the rubber elastic element 17 faces downwards in an axial direction thereof. An area at which a rubber elastic element 17 can be mounted (namely, a seal unit formable area) is an area on the strut piston rod 31 which lies to face an area on an inner circumferential surface 8 of a lower case 4 of a thrust bearing 1 which ranges from an upper end portion 9a to a lower end portion 9b of the inner circumferential surface 8 when the thrust bearing 1 is mounted on the strut piston rod 31 accordingly. Liquefied intrusion matters such as muddy water or the like which is absorbed by the bounce stopper 28 can be prevented from intruding into the interior (the rolling elements side) of the bearing by the seal unit in which the rubber elastic element 17 is mounted within the area.

Note that the application of the invention is not limited to the thrust ball bearing 1 described in the embodiments, and hence, the invention can be applied to a thrust roller bearing. The cases 3, 4 may be formed integrally with the corresponding rings. Namely, the upper case 3 and the lower case 4 may be formed integrally with the corresponding rings not only when they are formed of the synthetic resin but also when formed of a steel material.

Thus, as described heretofore, by providing the seal unit on the inner circumferential surface of the case of the thrust bearing or the outer circumferential surface of the strut piston rod 31, liquefied intrusion matters such as muddy water or the like can be prevented from intruding into the interior of the bearing from the gap between the inner circumferential surface of the case and the outer circumferential surface of the strut piston rod.

What is claimed is:

1. A thrust bearing supported by a coil spring seat and a strut piston rod, the thrust bearing comprising:
a primary case fixed to the strut piston rod;
a secondary case that is supported by the coil spring seat and is coaxially rotatable with respect to the primary case;
a plurality of rolling elements axially interposed between the primary and secondary cases; and
a seal unit provided on an inner circumferential surface of the secondary case,
wherein, when the strut piston rod is inserted into the secondary case, the seal unit is brought into contact with an outer circumferential surface of the strut piston rod for sealing a gap between the inner circumferential surface of the secondary case and the outer circumferential surface of the strut piston rod such that a liquid is prevented from intruding from the gap, and
wherein said seal unit is contained between an upper portion of the inner circumferential surface of the secondary case and a lower portion of the inner circumferential surface of the secondary case.

2. The thrust bearing according to claim 1, wherein the seal unit includes a rubber elastic element which is formed separately from the secondary case and is provided on the inner circumferential surface of the secondary case.

3. The thrust bearing according to claim 2, wherein the seal unit includes a groove on which the rubber elastic element is mounted.

4. The thrust bearing according to claim 1, wherein the seal unit is integrated with the secondary case so as to protrude from the inner circumferential surface thereof.

5. The thrust bearing according to claim 2, wherein the seal unit has an annular shape which fits the inner circumferential surface of the secondary case and includes a distal edge portion which contacts the strut piston rod and faces downward in an axial direction thereof.

6. The thrust bearing according to claim 1, wherein the primary case is provided with a primary ring forming an upper raceway surface, and the secondary case is provided with a secondary ring forming a lower raceway surface, and
wherein the plurality of rolling elements roll on the upper and lower raceway surfaces.

7. A suspension for a vehicle comprising:
a coil spring;
a shock absorber that is provided inside the coil spring and includes a strut piston rod having a piston provided at a lower end thereof;
a coil spring seat supported by the coil spring;
a thrust bearing that is supported by the coil spring seat; and
a bounce stopper comprising a porous elastic element which is suspended below the coil spring seat so as to cover the strut piston rod,
wherein the thrust bearing comprises:
a primary case fixed to an upper portion of the strut piston rod;
a secondary case that is supported by the coil spring seat and is coaxially rotatable with respect to the primary case;
a plurality of rolling elements axially interposed between the primary and secondary cases; and
a seal unit provided on an inner circumferential surface of the secondary case, wherein when the strut piston rod is inserted into the secondary case, the seal unit is brought into contact with an outer circumferential surface of the strut piston rod for sealing a gap between the inner circumferential surface of the secondary case and the outer circumferential surface of the strut piston rod such that a liquid is prevented from intruding from the gap, and
wherein said seal unit is contained between an upper portion of the inner circumferential surface of the secondary case and a lower portion of the inner circumferential surface of the secondary case.

8. The suspension according to claim 7, wherein the seal unit includes a rubber elastic element which is formed separately from the secondary case and is provided on the inner circumferential surface of the secondary case.

9. The suspension according to claim 8, wherein the seal unit includes a groove on which the rubber elastic element is mounted.

10. The suspension according to claim 7, wherein the seal unit is integrated with the secondary case so as to protrude from the inner circumferential surface thereof.

11. The suspension according to claim 8, wherein the seal unit has an annular shape which fits the inner circumferential surface of the secondary case and includes a distal edge portion which is to contact the strut piston rod and faces downward in an axial direction thereof.

12. The suspension according to claim 7, wherein the primary case is provided with a primary ring forming an upper raceway surface, and the secondary case is provided with a secondary ring forming a lower raceway surface, the plurality of rolling elements roll on the upper and lower raceway surfaces.

13. The thrust bearing according to claim 3, wherein the groove is formed annularly along a circumferential direction of the inner circumferential surface of the secondary case.

14. The thrust bearing according to claim 4, wherein the seal unit comprises a same material as the inner circumferential surface of the secondary case.

15. The thrust bearing according to claim 1, wherein the seal unit spans the gap.

16. The thrust bearing according to claim 1, wherein a distal end of the seal unit contacts the outer circumferential surface of the strut piston rod.

17. The suspension according to claim 9, wherein the groove is formed annularly along a circumferential direction of the inner circumferential surface of the secondary case.

18. The suspension according to claim 7, wherein a distal end of the seal unit contacts the outer circumferential surface of the strut piston rod.

19. The thrust bearing according to claim 1, wherein the seal unit contacts the secondary case only on the inner surface side of the secondary case.

20. The thrust bearing according to claim 1, wherein the seal unit comprises nitrile rubber.

* * * * *